(12) United States Patent
Kogure et al.

(10) Patent No.: US 6,451,917 B1
(45) Date of Patent: Sep. 17, 2002

(54) STYRENE RESIN MATERIAL

(75) Inventors: Masami Kogure; Keisuke Funaki; Takaaki Uchida, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/581,248

(22) PCT Filed: Oct. 20, 1999

(86) PCT No.: PCT/JP99/05990

§ 371 (c)(1),
(2), (4) Date: Jun. 26, 2000

(87) PCT Pub. No.: WO00/26297

PCT Pub. Date: May 11, 2000

(30) Foreign Application Priority Data

Oct. 29, 1998 (JP) .......................................... 10-308841

(51) Int. Cl.[7] .............................................. C08L 25/04
(52) U.S. Cl. ...................... 525/240; 525/241; 526/346; 526/347
(58) Field of Search ................................ 525/240, 241; 526/346, 347

(56) References Cited

U.S. PATENT DOCUMENTS

| 5,753,354 A | 5/1998 | Funaki et al. |
| 5,798,172 A | 8/1998 | Funaki et al. |
| 5,837,384 A | 11/1998 | Funaki et al. |
| 6,087,435 A | * 7/2000 | Nakano et al. ......... 525/241 X |

* cited by examiner

Primary Examiner—Fred Teskin
(74) Attorney, Agent, or Firm—Oblon, Spivak, McClelland, Maier & Neustadt, P.C.

(57) ABSTRACT

The invention relates to a styrene resin material, especially a styrene-based resin composition having good high-speed castability and good spreadability and favorable to extrusion molding lines. Of the styrene-based resin material, the product of the melt index (MI, g/10 min) and the melt tension (MT, g) measured under a specific condition is at least 20. Concretely, for example, it is a styrene-based resin composition comprising (A) from 35 to 95% by weight of a styrenic polymer having a syndiotactic structure, (B) from 5 to 50% by weight of a specific polyethylenic resin, and (C) from 0 to 15% by weight (including 0) of a specific styrene-olefin copolymer.

11 Claims, No Drawings

STYRENE RESIN MATERIAL

TECHNICAL FIELD

The present invention relates to a styrene-based resin material, precisely to a styrene-based resin material of which the product of MI and the melt tension (MT) is not smaller than a specific value, more precisely to the material of a styrene-based resin composition that contains a styrenic polymer essentially having a syndiotactic structure.

BACKGROUND ART

Styrenic polymers essentially having a syndiotactic structure (these are hereinafter referred to as "syndiotactic polystyrenes" or simply as "SPS") are known as resins having various excellent properties of heat resistance, oil resistance, etc. Having the advantages of such excellent properties, they are tried for many applications to wrapping and packaging films for edibles, to release sheets, etc., for which SPS is laminated with a resin film of polyethylene, polypropylene or with paper, etc.

For producing the laminates, employable is a method of sticking the substrates together with an adhesive, or a method of co-extruding the constituent resins. However, using an adhesive leads to the increase in the production costs, while the co-extrusion method could not apply to lamination with paper. In addition, in co-extruding different types of polymers, the viscosity of the polymers must be suitably controlled. Anyhow, these methods have such problems. Therefore, it is desired to establish an effective method of co-extrusion lamination for SPS.

In the method of co-extrusion lamination, however, the resins to be processed are required to have high-speed moldability, and the film layers formed are desired to be thin. To meet the requirements, the resins must indispensably have the properties of high-speed casting stability and good spreadability. The high-speed casting stability is meant to indicate that, even when a resin is cast at a high speed, the machine-direction edges (MD edges) of the resin film are all the time kept stable with no fluctuation in the width and the thickness of the film, and therefore the production loss is reduced. On the other hand, the spreadability is meant to indicate that the resin being molded is easy to spread.

None of conventional SPS and its resin compositions could satisfactorily meet the requirements of high-speed casting stability and spreadability. In this connection, it has heretofore been known that the melt index (hereinafter referred to as MI) and the melt tension (hereinafter referred to as MT) of resins have some influences on these properties thereof. Some resins with high MI could have good spreadability but their high-speed castability is often poor; while some others with low MI are not good as their high-speed castability and spreadability are both poor. MI and MT are said to have a negative correlation with each other, and resin materials having both good MI and good MT are unknown at present.

Regarding polyolefins, those having long-chain branches and having high MI are known to have good high-speed casting stability, and they are now in practical use. For improving the high-speed casting stability of SPS, therefore, it will be effective to blend SPS having high MI with polyolefins having long-chain branches and having high MI. However, SPS basically differs from polyolefins in their rheological characteristics. Therefore, merely adding polyolefins having long-chain branches and having high MI to SPS would be ineffective for attaining the intended object. Up to this point, no one could succeed in realizing SPS resin materials having both good high-speed castability and good spreadability.

Given that situation, we, the inventors have made the present invention, of which the object is to provide a styrene resin material, especially a styrene-based resin composition having good high-speed castability and good spreadability and favorable to extrusion molding lines.

DISCLOSURE OF THE INVENTION

We, the present inventors have assiduously studied and, as a result, have found that a styrene-based resin material of which the product of MI and the melt tension (MT) is not smaller than a specific value, more precisely a styrene-based resin composition containing SPS and satisfying the requirement has good high-speed castability and good spreadability, and is therefore favorable to extrusion molding lines. On the basis of this finding, we have completed the present invention.

Specifically, the invention is to provide a styrene-based resin material described below.

(1) A styrene-based resin material, of which the product of the melt index (MI, g/10 min) measured at 300° C. and under 2.16 kg, and the melt tension (MT, g) measured at 290° C., through an orifice having a diameter of 2.095 mm, at a cylinder outlet speed of $6.2 \times 10^2$ mm/min and at a take-up speed of $4.7 \times 10^4$ mm/min, is at least 20.

(2) The styrene-based resin material of above (1), which is a styrene-based resin composition comprising (A) from 35 to 95% by weight of a styrenic polymer, (B) from 5 to 50% by weight of an olefinic polymer, and (C) from 0 to 15% by weight (including 0) of a compound miscible with or having affinity for the component (A) and the component (B).

(3) The styrene-based resin material of above (1), which is a styrene-based resin composition comprising (A) from 35 to 95% by weight of a styrenic polymer of which the melt index (MI, g/10 min) at 300° C. and under 1.2 kg is at least 8 and which essentially has a syndiotactic structure, (B) from 5 to 50% by weight of a polyethylene-based resin, of which <1> the melt tension (MT, g) measured at 290° C., through an orifice having a diameter of 2.095 mm, at a cylinder outlet speed of $6.2 \times 10^2$ mm/min and at a take-up speed of $4.7 \times 10^4$ mm/min, falls between 0.3 and 10 and <2> the melt index (MI, g/10 min) at 190° C. and under 2.16 kg falls between 0.1 and 10, and (C) from 0 to 15% by weight (including 0) of a styrene-olefin copolymer having a styrene content of from 40 to 85% by weight.

(4) The styrene-based resin material of above (2) or (3), wherein the ratio of component (C)/component (B) falls between 0.1 and 0.4 (by weight) in the styrene-based resin composition.

BEST MODES OF CARRYING OUT THE INVENTION

Embodiments of the invention are described hereunder.

1. Styrene-based Resin Material of the Invention:

The styrene-based resin material of the invention is such that the product of its melt index (MI, g/10 min) measured at 300° C. and under 2.16 kg, and its melt tension (MT, g) measured at 290° C., through an orifice having a diameter of 2.095 mm, at a cylinder outlet speed of $6.2 \times 10^2$ mm/min and at a take-up speed of $4.7 \times 10^4$ mm/min, is at least 20, preferably at least 30.

(1) Melt index (MI, g/10 min):

MI of the resin material is measured according to JIS K7210, at 300° C. and under 2.16 kg.

(2) Melt tension (MT, g):

MT of the resin material is measured at 290° C., through an orifice having a diameter of 2.095 mm, at a cylinder outlet speed of $6.2 \times 10^2$ mm/min and at a take-up speed of $4.7 \times 10^4$ mm/min, for which, concretely, used is a Toyo Seiki's device, Capillograph 1C.

(3) The product of MT and MI must be at least 20, but is preferably at least 30. If the product is smaller than 20, the width of the cast sheet of the resin material greatly fluctuates and the thickness thereof could not be unified, whereby the productivity of the cast sheet will lower.

2. Concrete Examples of the Material Satisfying the Requirements:

The styrene-based resin material satisfying the requirements is not specifically defined. Concretely, it includes styrene-based resin compositions mentioned below.

One preferred embodiment of the resin material is a styrene-based resin composition comprising (A) from 35 to 95% by weight of a styrenic polymer, (B) from 5 to 50% by weight of an olefinic polymer, and (C) from 0 to 15% by weight (including 0) of a compound miscible with or having affinity for the component (A) and the component (B). More preferably, the resin composition comprises (A) from 35 to 95% by weight of a styrenic polymer of which the melt index (MI, g/10 min) at 300° C. and under 1.2 kg is at least 8 and which essentially has a syndiotactic structure, (B) from 5 to 50% by weight of a polyethylene-based resin, of which <1> the melt tension (MT, g) measured at 290° C., through an orifice having a diameter of 2.095 mm, at a cylinder outlet speed of $6.2 \times 10^2$ mm/min and at a take-up speed of $4.7 \times 10^4$ mm/min, falls between 0.3 and 10 and <2> the melt index (MI, g/10 min) at 190° C. and under 2.16 kg falls between 0.1 and 10, and (C) from 0 to 15% by weight (including 0) of a styrene-olefin copolymer having a styrene content of from 40 to 85% by weight. In the resin composition, more preferably, the ratio of component (C)/component (B) falls between 0.1 and 0.4 (by weight).

(1) Details of Constituent Components:

The constituent components are described in detail hereunder.

(A) Styrenic Polymer:

Preferably, the styrenic polymer preferably essentially has a syndiotactic structure.

Of the styrenic polymer essentially having a syndiotactic structure, the syndiotactic structure indicates the stereo-structure of the polymer, in which the side chains of phenyl groups are alternately positioned on the opposite sides relative to the main chain composed of carbon-carbon bonds, and its tacticity is determined according to the nuclear magnetic resonance of the polymer with an isotopic carbon ($^{13}$C-NMR). The tacticity to be determined according to $^{13}$C-NMR indicates the proportion of a plurality of continuous constitutional units in a polymer. For example, a polymer comprising two continuous constitutional units is referred to as a diad; that comprising three continuous constitutional units is referred to as a triad; and that comprising five continuous constitutional units is referred to as a pentad. The styrenic polymer essentially having a syndiotactic structure as referred to herein generally has a racemic diad syndiotacticity of 75% or higher, preferably 85% or higher, or has a racemic pentad syndiotacticity of 30% or higher, preferably 50% or higher, including, for example, polystyrene, poly(alkylstyrenes), poly(arylstyrenes), poly(halogenostyrenes), poly(halogenoalkylstyrenes), poly(alkoxystyrenes), poly(vinylbenzoates), hydrogenated derivatives of those polymers, their mixtures, and copolymers consisting essentially of those polymers. The poly(alkylstyrenes) include poly(methylstyrene), poly(ethylstyrene), poly(isopropylstyrene), poly(tert-butylstyrene), etc.; and the poly(arylstyrenes) include poly(phenylstyrene), poly(vinylnaphthalene), poly(vinylstyrene), etc. The poly (halogenostyrenes) include poly(chlorostyrene), poly(bromostyrene), poly(fluorostyrene), etc. The poly(halogenoalkylstyrenes) include poly(chloromethylstyrene), etc.: and the poly(alkoxystyrenes) include poly(methoxystyrene), poly(ethoxystyrene), etc.

Of those styrenic polymers, preferred are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene, and copolymers comprising those constitutional units.

Especially preferred are syndiotactic polystyrenes, of which the melt index (MI, g/10 min) measured at 300° C. and under 1.2 kg is at least 8, more preferably at least 10. Syndiotactic polystyrenes having MI of smaller than 8 are undesirable, as they could be hardly formed in thin films when cast at a high speed.

Such syndiotactic styrenic polymers can be produced, for example, by polymerizing styrenic monomers (corresponding to the intended styrenic polymer) in an inert hydrocarbon solvent or in the absence of a solvent, in the presence of a catalyst that comprises a titanium compound and a condensate of a trialkylaluminium compound with water (Japanese Patent Laid-Open No. 187708/1987). Poly(halogenoalkylstyrenes) may be produced according to the method described in Japanese Patent Laid-Open No. 46912/1989; and their hydrogenated polymers may be produced according to the method described in Japanese Patent Laid-Open No. 178505/1989.

(B) Olefinic Polymer:

The olefinic polymer may be any one containing monomer units derived from olefins or dienes, such as ethylene, propylene, butylene, butene, octene, butadiene, isoprene, norbornene, norbornadiene, cyclopentadiene, etc. It includes all known olefinic polymers.

Specific examples of the olefinic polymer are high-density polyethylene, linear low-density polyethylene, high-pressure process, low-density polyethylene, ethylene-propylene rubber (EPM), ethylene-propylene-diene rubber (EPDM), ethylene-octene copolymer elastomer, isotactic polypropylene, syndiotactic polypropylene, atactic polypropylene, block polypropylene, random polypropylene, polybutadiene, polyisoprene, polyisobutylene, polybutene, O-methylpentene, cyclic polyolefins, as well as copolymers obtained from at least two monomers for those olefinic polymers, etc. Above all, preferred are polyethylene-based resins, of which <1> the melt tension (MT, g) measured at 290° C., through an orifice having a diameter of 2.095 mm, at a cylinder outlet speed of $6.2 \times 10^2$ mm/min and at a take-up speed of $4.7 \times 10^4$ mm/min, falls between 0.3 and 10, more preferably between 0.3 and 7, and <2> the melt index (MI, g/10 min) at 190° C. and under 2.16 kg falls between 0.05 and 10, more preferably between 0.1 and 8, even more preferably between 0.1 and 5, as they ensure high-speed casting stability and spreadability of the styrene-based resin composition comprising any of them. Polyethylene-based resins of which MI is smaller than 0.05 are unfavorable since the resin composition could hardly be formed into thin films; and those of which MI is larger than 10 are also unfavorable since the casting stability of the resin composition will lower.

(C) Compound Miscible with or Having Affinity for Component (A) and Component (B):

Concretely, preferred for the compound (C) are styrene-olefin copolymers having a styrene content of from 40 to 85% by weight. Specific examples of the copolymers are styrene-butadiene random copolymer, hydrogenated styrene-butadiene random copolymer, styrene-isoprene random copolymer, hydrogenated styrene-isoprene random copolymer, styrene-butadiene block copolymer (SBR), hydrogenated styrene-butadiene block copolymer (SEB, SEBC), styrene-butadiene-styrene block copolymer (SBS), hydrogenated styrene-butadiene-styrene block copolymer (SEBS), styrene-isoprene block copolymer (SIR), hydrogenated styrene-isoprene block copolymers (SEP), styrene-isoprene-styrene block copolymer (SIS), hydrogenated styrene-isoprene-styrene block copolymer (SEPS), styrene-ethylene copolymer, styrene-propylene copolymer, ethylene-styrene graft copolymer, propylene-styrene graft copolymer, EPM-styrene graft copolymer, EPDM-styrene graft copolymer, and their modified derivatives, etc. Of those, preferred are styrene-olefin diblock copolymers, and styrene-olefin triblock copolymers. Concretely, preferred are SBR, SEB, SEBC, SBS, SEBS, SIR, SEP, SIS, SEPS, and their modified derivatives such as MASEBS.

Preferably, the styrene-olefin copolymer has a styrene content of from 40 to 85% by weight, more preferably from 45 to 80% by weight. If its styrene content is smaller than 40% by weight, the copolymer could not exhibit its effect; but if larger than 85% by weight, the copolymer could not ensure high-speed casting stability of the resin composition.

One or more of these copolymers may be in the resin composition either singly or as combined.

(D) Other Components:

Apart from the components (A) to (C) mentioned above, the resin material of the invention may optionally contain any other components such as rubber-like elastomer, anti-blocking agent, antioxidant, nucleating agent, antistatic agent, process oil, plasticizer, lubricant, flame-retardant, flame-retardation promoter, pigment, etc., so far as the additional components do not interfere with the object of the invention. The amount of the additional components is not specifically defined, and could be defined in accordance with the object of the invention.

(i) Rubber-like Elastomer:

The rubber-like elastomer for use in the invention includes, for example, natural rubber; olefinic rubbers such as polybutadiene, polyisoprene, polyisobutylene, neoprene, polysulfide rubber, Thiokol rubber, acrylic rubber, urethane rubber, silicone rubber, epichlorohydrin rubber, styrene-butadiene block copolymer (SBR), hydrogenated styrene-butadiene block copolymer (SEB), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), ethylene-propylene rubber (EPM), ethylene-propylene-diene rubber (EPDM), linear low-density polyethylene elastomer, etc.; as well as core/shell type, granular elastomers, such as butadiene-acrylonitrile-styrene core/shell rubber (ABS), methyl methacrylate-butadiene-styrene core/shell rubber (MBS), methyl methacrylate-butyl acrylate-styrene core/shell rubber (MAS), octyl acrylate-butadiene-styrene core/shell rubber (MABS), alkyl acrylate-butadiene-acrylonitrile-styrene core/shell rubber (AABS), butadiene-styrene core/shell rubber (SBR), siloxane-containing core/shell rubber of typically methyl methacrylate-butyl acrylate siloxanes, etc.; and denatured rubbers to be prepared by denaturing those rubber materials.

Of those, especially preferred are SBR, SEB, SBS, SEBS, SIR, SEP, SIS, SEPS, core/shell rubbers, EPMS, EPDM, linear low-density polyethylene elastomer, and denatured rubbers from them.

(ii) Thermoplastic Resin Except Syndiotactic Polystyrene:

Any known thermoplastic resins except syndiotactic polystyrene are usable herein. Concretely, they include polyolefin-based resins typically such as linear high-density polyethylene, linear low-density polyethylene, high-pressure process, low-density polyethylene, isotactic polypropylene, syndiotactic polypropylene, block polypropylene, random polypropylene, polybutene, 1,2-polybutadiene, 4-methylpentene, cyclic polyolefins and their copolymers; polystyrene-based resins typically such as atactic polystyrene, isotactic polystyrene, HIPS, ABS, AS, styrene-methacrylic acid copolymer, styrene-alkyl methacrylate copolymer, styrene-glycidyl methacrylate copolymer, styrene-acrylic acid copolymer, styrene-alkyl acrylate copolymer, styrene-maleic acid copolymer, styrene-fumaric acid copolymer; polyester resins such as polycarbonate, polyethylene terephthalate, polybutylene terephthalate; polyamide resins such as polyamide 6, polyamide 6,6; and polyphenylene ether, PPS, etc. One or more of those thermoplastic resins can be used herein either singly or as combined.

The amount of the thermoplastic resin except syndiotactic polystyrene, which may be in the resin composition of the invention, is not specifically defined, and could be suitably defined in accordance with the object of the invention.

(iii) Anti-blocking Agent (AB Agent):

The anti-blocking agent for use herein may be inorganic or organic particles mentioned below.

Inorganic particles for the agent are of oxides, hydroxides, sulfides, nitrides, halides, carbonates, sulfates, acetates, phosphates, phosphites, organic carboxylates, silicates, titanates and borates of elements of Groups IA, IIA, IVA, VIA, VIIA, VIIIA, IB, IIB, IIIB and IVB; their hydrates, composite compounds essentially comprising them; and natural mineral particles.

Concretely, they include particles of Group IA element compounds such as lithium fluoride, borax (sodium borate hydrate), etc.; those of Group IIA element compounds such as magnesium carbonate, magnesium phosphate, magnesium oxide (magnesia), magnesium chloride, magnesium acetate, magnesium fluoride, magnesium titanate, magnesium silicate, magnesium silicatehydrate (talc), calciumcarbonate, calciumphosphate, calcium phosphite, calcium sulfate (gypsum), calcium acetate, calcium terephthalate, calcium hydroxide, calcium silicate, calcium fluoride, calcium silicate, strontium titanate, barium carbonate, barium phosphate, barium sulfate, barium sulfite, etc.; those of Group IVA element compounds such as titanium dioxide (titania), titanium monoxide, titanium nitride, zirconium dioxide (zirconia), zirconium monoxide, etc.; those of Group VIA element compounds such as molybdenum dioxide, molybdenum trioxide, molybdenum sulfide, etc.; those of Group VIIA element compounds such as manganese chloride, manganese acetate, etc.; those of Group VIII element compounds such as cobalt chloride, cobalt acetate, etc.; those of Group IB element compounds such as cuprous iodide, etc.; those of Group IIB element compound such as zinc oxide, zinc acetate, etc.; those of Group IIIB element compounds such as aluminium oxide (alumina), aluminium hydroxide, aluminium fluoride, alumina silicates (kaolin, kaolinite), etc.; those of Group IVB element compounds such as silicon oxide (silica, silica gel), graphite, carbon, glass, etc.; and those of natural minerals such as carnallite, kainite, mica (phlogopite), etc.

Organic particles for the anti-blocking agent are of Teflon, melamine resin, styrene-divinylbenzene copolymer, acrylic resin silicone, and their crosslinked derivatives. The inorganic particles for use herein may have a mean particle size of from 0.1 to 10 μm; and their amount that may be in the resin composition preferably falls between 0.01 and 15% by weight.

One or more such anti-blocking agents may be in the resin composition either singly or as combined.

(iv) Antioxidant:

The antioxidant that may be in the resin composition may be any one selected from known phenolic antioxidants, phosphorus-containing antioxidants, sulfur-containing antioxidants, etc.

Phenolic antioxidants usable herein are not specifically defined, including, for example, 2,6-di-t-butyl-4-methylphenol, 2,6-di-t-butyl-4-ethylphenol, 2,6-di-t-butyl-4-phenylphenol, 2,2'-methylenebis(4-methyl-6-t-butylphenol), 2,2'-methylenebis(4-ethyl-6-t-butylphenol), 2,2'-methylenebis(4-ethyl-6-n-nonylphenol), 4,4'-butylidenebis(3-methyl-6-t-butylphenol), 4,4'-thiobis(3-methyl-6-t-butylphenol), 1,1,3-tris(5-t-butyl-4-hydroxy-2-methylphenyl)butane, 2-t-butyl-6-(3-t-butyl-2-hydroxy-5-methylbenzyl)-4-methylphenyl acrylate, 2´[1-)2-hydroxy-3,5-di-t-pentylphenyl)ethyl]-4,6-di-t-pentylphenyl acrylate, n-octadecyl-3-(3,5-di-t-butyl-4-hydroxyphenyl)propionate, diethyl 3,5-di-t-butyl-4-hydroxybenzylphosphonate, triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,2-thio-diethylenebis[3-(3,5-di-t-butyl-4-hydroxyphenyl)propionate], N,N'-hexamethylenebis(3,5-di-t-butyl-4-hydroxy-hydrocinnamide), 3,9-bis[1,1-dimethyl-2-[β-(3-t-butyl-4-hydroxy-5-methylphenyl)propionyloxy]ethyl]-2,4,8,10-tetroxaspiro[5,5]undecane, N,N'-bis[3-(3,5-di-t-butyl-4-hydroxyphenyl)propionyl]hydrazine, pentaerythrityl tetrakis[3-(3,5-di-t-butyl-4-hydroxyphenyl)propionate], 2,4-bis(n-octylthio)-6-(4-hydroxy-3,5-di-t-butylanilino)-1,3,5-triazine, 1,3,5-trimethyl-2,4,6-tris(3,5-di-t-butyl-4-hydroxybenzyl)benzene, tris(3,5-di-t-butyl-4-hydroxybenzyl) isocyanurate, tris(4-t-butyl-2,6-dimethyl-3-hydroxybenzyl) isocyanurate, etc. Of the phenolic compounds, especially preferred are those of the following general formula (1):

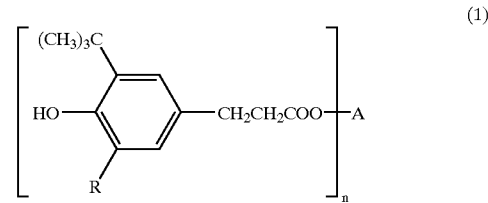

(1)

wherein R represents a methyl group, or a t-butyl group; A represents a residue of an alcohol having from 1 to 4 hydroxyl groups, which is derived from the alcohol by removing a predetermined number, n, of hydroxyl groups from it; and n indicates an integer of from 1 to 4.

Phosphorus-containing antioxidants usable herein are also not specifically defined, including, for example, di(nonylphenyl)pentaerythritol diphosphite, phenyl-bisphenol A-pentaerythritol diphosphite, distearylpentaerythritol diphosphite, dioctylpentaerythritol diphosphite, dilaurylpentaerythritol diphosphite, diphenylpentaerythritol diphosphite, dicyclohexylpentaerythritol diphosphite, bis(2,4-di-t-butylphenyl)pentaerythritol diphosphite, bis(2,6-di-t-butyl-4-methylphenyl)pentaerythritol diphosphite, bis(2,4,6-tri-t-butylphenyl)pentaerythritol diphosphite, tetrakis(2,4-di-t-butylphenyl)-4,4'-biphenylene phosphonite, 2,2'-ethylidenebis(4,6-di-t-butylphenyl) fluorophosphite, 2,2'-methylenebis(4,6-di-t-butylphenyl)octyl phosphite, 9,10-dihydro-9-oxa-10-phosphaphenanthrene-10-oxide, tris (isodecyl) phosphite, tris(tridecyl) phosphite, phenyldiisooctyl phosphite, phenyldiisodecyl phosphite, phenyldi (tridecyl) phosphite, diphenylisooctyl phosphite, diphenylisodecyl phosphite, diphenyltridecyl phosphite, triphenyl phosphite, tris(2,4-di-t-butylphenyl) phosphite, tris (monononylphenyl) phosphite, tris(mono, dinonylphenyl) phosphite, 4,4'-isopropylidenediphenol tetraalkyldiphosphite in which the alkyl group has from 12 to 15 carbon atoms, 4,4'-butylidene-bis(3-methyl-6-t-butylphenyl-di-tridecyl) phosphite, 1,1,3-tris(2-methyl-4-di-tridecylphosphite-5-t-butylphenyl)butane, etc. Of the phosphorus-containing compounds, especially preferred are those of the following general formula (2):

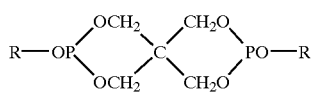

wherein R's each independently represent an alkyl group, an aryl group, or an alkylaryl group; and R's may be the same or different. Of the compounds of formula (2), more preferred are those where R is an alkylaryl group.

Sulfur-containing antioxidants usable herein are also not specifically defined, including, for example, dilauryl 3,3'-thiodipropionate, ditridecyl 3,3'-thiodipropionate, dimyristyl 3,3'-thiodipropionate, distearyl 3,3'-thiodipropionate, distearyl 3,3'-methyl-3,3'-thiodipropionate, bis-2-methyl-4-(3-n-alkyl (C12 or C14)-thiopropionyloxy)-5-t-butylphenyl sulfide, tetrakis[methylene-3-(hexylthio)propionate] methane, tetrakis[methylene-3-(dodecylthio)propionate] methane, tetrakis methylene-3-(octadecylthio)propionate] methane, 2,2-thio-diethylenebis[3-(3,5-di-t-butyl-4-hydroxyphenyl)propionate], 4,4'-thiobis(3-methyl-6-t-butylphenol), 2-mercaptobenzimidazole, 2-mercaptomethylbenzimidazole, etc. Of the sulfur-containing compounds, especially preferred are those of the following general formula (3):

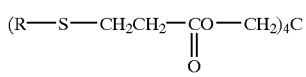

wherein R represents a C6, C12 or C18 alkyl group. Of the compounds of formula (3), more preferred are those where R is a C12 alkyl group, as they are stable against heat and oxidation.

One or more of these antioxidants may be in the resin composition either singly or as combined.

(v) Nucleating Agent:

The nucleating agent that maybe in the resin composition may be any known one, for example, selected from metal carboxylates such as typically aluminium di(p-t-butylbenzoate), metal phosphates such as typically sodium methylenebis (2,4-di-t-butylphenol) acid phosphate, as well as talc, phthalocyanine derivatives, etc. One or more such nucleating agents may be in the resin composition either singly or as combined.

(vi) Plasticizer:

The plasticizer that may be in the resin composition may be any known one, for example, selected from polyethylene glycol, polyamide oligomers, ethylenebisstearamide, phthalates, polystyrene oligomers, polyethylene wax, silicone oil, etc. One or more such plasticizers may be in the resin composition either singly or as combined.

(vii) Lubricant:

The lubricant that may be in the resin composition may be any known one, for example, selected from polyethylene wax, silicone oil, long-chain carboxylic acids, metal salts of long-chain carboxylic acids, etc. One or more such lubricants may be in the resin composition either singly or as combined.

(viii) Process Oil:

To improve the extensibility of the resin material, process oil having a kinematic viscosity at 40° C. of from 15 to 600 centistokes (cs) may be added thereto.

Process oil is grouped into paraffinic oil, naphthenic oil and aromatic oil, depending on its properties. Of these, paraffinic oil of such that the number of carbon atoms constituting the paraffin moiety (linear chain moiety) of it, which is measured according to an n-d-M method, accounts for at least 60% Cp of the number of total carbon atoms constituting the oil is preferred for use in the invention.

Regarding the viscosity of process oil for use in the invention, it is desirable that the kinematic viscosity thereof at 40° C. falls between 15 and 600 cs, more preferably between 15 and 500 cs.

Process oil of which the kinematic viscosity is lower than 15 cs could be effective for improving the extensibility of the resin material but, as its boiling point is low, it will produce white smoke to yellow the resin material containing SPS or will often make the resin material adhere to rolls while it is kneaded in melt with the resin material or while the resin material containing it is molded. On the other hand, process oil of which the kinematic viscosity is higher than 600 cs would not produce white smoke to yellow the resin material, but its effect of improving the extensibility of the resin material is poor.

(2) Blend Ratio of Constituent Components:

To prepare the resin composition of the invention, the constituent components (A) to (C) are blended preferably in such a ratio that the amount of the styrenic polymer (A) falls between 35 and 95% by weight, more preferably between 50 and 90% by weight, the amount of the olefinic polymer (B) falls between 5 and 50% by weight, more preferably between 10 and 45% by weight, and the amount of the compound (C), which is miscible with or has affinity for the components (A) and (B), falls between 0 and 15% by weight (including 0), more preferably between 1 and 13% by weight. In the resin composition, the ratio of (C)/(B) b weight preferably falls between 0.1 and 0.4, more preferably between 0.15 and 0.35.

If the amount of the styrenic polymer (A) is smaller than 35% by weight, the resin composition could not have good heat resistance and good oil resistance both intrinsic to SPS; but if larger than 95% by weight, the resin composition could not have good high-speed casting stability. If the amount of the compound (C), which is miscible with or has affinity for the components (A) and (B), is larger than 15% by weight, too much compound (C) could not be well miscible with the components (A) and (B) and therefore the resin composition could not have good high-speed casting stability.

(3) Method of Blending Constituent Components:

The method of blending the constituent components to prepare the resin composition of the invention is not specifically defined. For example, herein employable is any of a method of blending and kneading them in melt in any stage of preparing syndiotactic polystyrene; a method of blending and kneading them in melt after the components have been separately prepared; or a method of blending the components in dry followed by kneading them in melt in an extruder through which the resulting melt blend is formed into films.

3. Use of Styrene-based Resin Material of the Invention:

As having good high-speed castability and good spreadability, as so mentioned hereinabove, and the styrene-based resin material of the invention has many applications.

For example, the resin material may be formed into laminates with paper or synthetic paper, and the laminates are usable for heat-resistant containers, cooking paper, baking cartons, release paper, processing paper, etc. It may be formed into laminates with other polymers, for example with polyethylene, polypropylene or the like, and the laminates are usable for tearable wrapping or packaging films. When it is laminated with polypropylene, polymethylpentene or the like, the laminates are usable for release sheets; or when laminated with any of polyesters, polyamides or the like, the laminates are usable for non-hydrolytic heat-resistant sheets; or when laminated with polystyrene or PPS, the laminates are usable for oil-resistant sheets and containers.

The resin material of the invention has such many applications as above, but it not limited thereto.

The invention is describe in more detail with reference to the following Examples and Comparative Examples, which, however, are not intended to restrict the scope of the invention.

Methods of Evaluating Physical Properties of Resin Material (1) Melt index (MI):

Measured according to JIS K7210.

(2) Melt tension (MT):

Used is a Toyo Seiki's device, Capillograph 1C. The melt tension of the resin material is measured at 290° C., through an orifice having a diameter of 2.095 mm, at a cylinder outlet speed of $6.2 \times 10^2$ mm/min and at a take-up speed of $4.7 \times 10^4$ mm/min.

(3) Cast Film Width Fluctuation:

This is an index of the high-speed casting stability of the resin material. While the resin material is cast into a film, the film width fluctuation is measured at a predetermined number, n, of points in the machine direction (MD) relative to the mean film width in a predetermined period of running time, and the data are averaged to give the cast film width fluctuation in percentage. Concretely, it is represented by the following equation (1):

Cast Film Width Fluctuation $$\frac{\sqrt{\frac{\sum_{i=1}^{n}(W(i)-W_{ave})^2}{n}}}{W_{ave}} \quad (1)$$

wherein n indicates the point for measurement, including from i=1 to n=n; W(i) indicates the film width at the point i; and Wave indicates the mean film width within a predetermined period of running time.

Raw Materials Used

Component (A):

SPS1:
Syndiotactic polystyrene, Idemitsu Petrochemical's Xarec with Tm=270° C., MI=9 (300° C., 1.2 kgf).

SPS2:
Syndiotactic polystyrene, Idemitsu Petrochemical's Xarec with Tm=270° C., MI=13 (300° C., 1.2 kgf).

SPS3:
Syndiotactic polystyrene, Idemitsu Petrochemical's Xarec with Tm=270° C., MI=18 (300° C., 1.2 kgf).

SPS4:
Syndiotactic polystyrene, Idemitsu Petrochemical's Xarec with Tm=270° C., MI=60 (300° C., 1.2 kgf).

SPS5:
Syndiotactic polystyrene, Idemitsu Petrochemical's Xarec with Tm=270° C., MI=3 (300° C., 1.2 kgf).

Component (B):

PE1:
High-pressure process, low-density polyethylene, Nippon Unicar's NUC-8505 with MT=1, MI=0.8 and density=0.923.

PE2:
High-pressure process, low-density polyethylene, Nippon Polychem's LF405M with MT=2.9, MI=2.0 and density=0.919.

PE3:
High-pressure process, low-density polyethylene, Nippon Polychem's HE30 with MT=4.5, MI=0.3 and density=0.920.

PE4:
High-pressure process, low-density polyethylene, Nippon Polychem's LC500 with MT=1.5, MI=4.0 and density=0.918.

PE5:
High-pressure process, low-density polyethylene, Nippon Unicar's NUC-8042 with MT=4.6, MI=0.15 and density=0.920.

PE6:
Linear low-density polyethylene, Dow's Engage 8200 with MT=less than 0.2, MI=5 and density=0.870.

PE7:
Linear low-density polyethylene, Dow's Engage 8400 with MT=less than 0.2, MI=30 and density=0.870.

PE8:
Linear low-density polyethylene, Dow's Engage 8150 with MT=less than 0.2, MI=0.5 and density=0.868.

PE9:
High-pressure process, low-density polyethylene, Nippon Polychem's Novatec LC701 with MT=0.7, MI=14 and density =0.918.

Component (C):

SEBS1:
SEBS-type elastomer, Asahi Kasei's Toughtec H1081 with styrene content of 60% by weight.

SEBS2:
SEBS-type elastomer, Kuraray's KL8006 with styrene content of 30% by weight.

SEBS3:
SEBS-type elastomer, Asahi Kasei's M1962 with styrene content of 30% by weight.

SEPS1:
SEPS-type elastomer, Kuraray's Septon 2104 with styrene content of 65% by weight.

EXAMPLE 1

SPS1 (Idemitsu Petrochemical's Xarec with MI=9 and Tm=270° C.) was mixed with PE1 (high-pressure process, low-density polyethylene, Nippon Unicar's NUC-8505) in a ratio of 70/30% by weight. To 100 parts by weight of the resulting mixture, added were 0.1 parts by weight of Ciba-Geigy's Irganox 1010 and 0.1 parts by weight of Asahi Denka's PEP36 both serving as an antioxidant, and blended in dry. The dry blend was then kneaded in melt in a 35 mmφ-double screw extruder to prepare pellets. The pellets were led into a 30 mmφ-double screw extruder equipped with a T-die having a width of 300 mm and a lip opening of 1 mm. Thus melted therein, the resin melt was extruded out through the T-die at 300° C. and at a resin output of 5 kg/hr, and cast on a chill roll at a take-up speed of 10 m/min to form a cast film having a thickness of 40 μm.

The data are given in Table 1.

EXAMPLES 2 to 9

The same process as in Example 1 was repeated, except that the materials and the compositions were varied as in Table 1.

The data are given in Table 1.

COMPARATIVE EXAMPLE 1

SPS3 (Idemitsu Petrochemical's Xarec with MI=18 and Tm=270° C.) was mixed with SEBS2 (SEBS-type elastomer, Kuraray's KL8006) in a ratio of 80/20% by weight. To 100 parts by weight of the resulting mixture, added were 0.1 parts by weight of Ciba-Geigy's Irganox 1010 and 0.1 parts by weight of Asahi Denka's PEP36 both serving as an antioxidant, and blended in dry. The dry blend was then kneaded in melt in a 35 mmφ-double screw extruder to prepare pellets. The pellets were cast into a film in the same manner as in Example 1.

The data are given in Table 1.

COMPARATIVE EXAMPLES 2 to 6

The same process as in Comparative Example 1 was repeated, except that the materials and the compositions were varied as in Table 1.

The data are given in Table 1.

COMPARATIVE EXAMPLE 7

SPS5 (Idemitsu Petrochemical's Xarec with MI=3 and Tm=270° C.), SEBS2 (SEBS-type elastomer, Kuraray's KL8006), SEBS3 (SEBS-type elastomer, Kuraray's M1962) and polyphenylene ether (Mitsubishi Engineering Plastics' YPX-100H) were mixed in a ratio of 66.5/24/6/3.5% by weight. To parts by weight of the resulting mixture, added were 0.1 s by weight of Ciba-Geigy's Irganox 1010 and 0.1 parts by weight of Asahi Denka's PEP36 both serving as an antioxidant, and blended in dry. The dry blend was then kneaded in melt in a 35 mmφ-double screw extruder to prepare pellets. The pellets were cast into a film in the same manner as in Example 1.

The data are given in Table 1.

TABLE 1

| | Composition of Essential Components | | | | | | | | | | Characteristics of Composition | | | Cast Film Width Fluctuation |
|---|---|---|---|---|---|---|---|---|---|---|---|---|---|---|
| | Component (A) | | Component (B) | | Component (C) | | Component (D) | | | | | | | |
| | Type | Amount | Type | Amount | Type | Amount | Type | Amount | Type | Amount | MI | MT | MI × MT | (%) |
| Ex. 1 | SPS1 | 70 wt. % | PE1 | 30 wt. % | | | | | | | 20 | 1.1 | 22 | 5.6 |
| Ex. 2 | SPS2 | 70 wt. % | PE1 | 24 wt. % | SEBS1 | 6 wt. % | | | | | 27 | 1.3 | 35 | 0.4 |
| Ex. 3 | SPS2 | 70 wt. % | PE2 | 24 wt. % | SEBS1 | 6 wt. % | | | | | 32 | 1.4 | 45 | 0.8 |
| Ex. 4 | SPS3 | 70 wt. % | PE2 | 24 wt. % | SEBS1 | 6 wt. % | | | | | 37 | 1.3 | 48 | 0.4 |
| Ex. 5 | SPS4 | 70 wt. % | PE2 | 24 wt. % | SEBS1 | 6 wt. % | | | | | 82 | 0.8 | 66 | 0.4 |
| Ex. 6 | SPS2 | 80 wt. % | PE2 | 16 wt. % | SEBS1 | 4 wt. % | | | | | 33 | 1.0 | 33 | 2 |
| Ex. 7 | SPS2 | 70 wt. % | PE3 | 24 wt. % | SEBS1 | 6 wt. % | | | | | 23 | 2.5 | 58 | 1.2 |
| Ex. 8 | SPS2 | 70 wt. % | PE4 | 24 wt. % | SEBS1 | 6 wt. % | | | | | 36 | 0.9 | 32 | 2 |
| Ex. 9 | SPS2 | 70 wt. % | PE5 | 24 wt. % | SEPS1 | 6 wt. % | | | | | 32 | 1.5 | 48 | 0.9 |
| Co. Ex. 1 | SPS3 | 80 wt. % | | | SEBS2 | 20 wt. % | | | | | 22 | 0.3 | 6.6 | 26 |
| Co. Ex. 2 | SPS3 | 80 wt. % | PE6 | 12 wt. % | SEBS2 | 4 wt. % | SEBS1 | 4 wt. % | | | 32 | 0.3 | 9.6 | 26 |
| Co. Ex. 3 | SPS3 | 80 wt. % | PE7 | 16 wt. % | SEBS1 | 4 wt. % | | | | | 50 | 0.2 | 10 | 14 |
| Co. Ex. 4 | SPS3 | 70 wt. % | PE8 | 18 wt. % | SEBS2 | 6 wt. % | SEBS1 | 6 wt. % | | | 27 | 0.6 | 16 | 18 |
| Co. Ex. 5 | SPS3 | 70 wt. % | PE9 | 24 wt. % | SEBS1 | 6 wt. % | | | | | 53 | 0.3 | 16 | 12 |
| Co. Ex. 6 | SPS5 | 80 wt. % | | | SEBS2 | 20 wt. % | | | | | 6 | 0.8 | 4.8 | 28 |
| Co. Ex. 7 | SPS5 | 66.5 wt. % | | | SEBS2 | 24 wt. % | SEBS3 | 6 wt. % | PPO | 3.5 wt. % | 3 | 0.8 | 2.4 | 28 |

INDUSTRIAL APPLICABILITY

According to the present invention, obtained is a styrene resin material, especially a styrene-based resin composition having good high-speed castability and good spreadability and favorable to extrusion molding lines.

What is claimed is:

1. A styrene resin composition, comprising;
   (A) from 35 to 95% by weight of a styrenic polymer of which the melt index (MI, g/10 min) at 300° C. and under 1.2 kg is at least 8 and which essentially has a syndiotactic structure,
   (B) from 5 to 50% by weight of a polyethylene resin, of which <1> the melt tension (MT, g) measured at 290° C., through an orifice having a diameter of 2.095 mm, at a cylinder outlet speed of $6.2 \times 10^2$ mm/min and at a take-up speed of $4.7\times10^4$ mm/min, is from 0.3 to 10 and <2> the melt index (MI, g/10 min) at 190° C. and under 2.16 kg is from 0.1 to 10, and (C) from 0 to 15% by weight of a styrene-olefin copolymer having a styrene content of from 40 to 85% by weight, wherein the product of (a) the melt index (MI, g/10 min) of the styrene resin composition, measured at 300° C. and under 1.2 kg, and (b) the melt tension (MT, g) of the styrene resin composition, measured at 290° C. through an orifice having a diameter of 2.095 mm at a cylinder outlet speed of $6.2\times10^2$ mm/min and at a take-up speed of $4.7\times10^4$ mm/min, is at least 20.

2. The styrene resin composition as claimed in claim 1, wherein the ratio of component (C)/component (B) is from 0.1 to 0.4 by weight in the styrene resin composition.

3. A styrene resin composition, comprising;

(A) from 35 to 95% by weight of a styrenic polymer of which the melt index (MI, g/10 min) at 300° C. and under 1.2 kg is at least 8 and which essentially has a syndiotactic structure, (B) from 5 to 50% by weight of an olefinic polymer, of which <1> the melt tension (MT, g) measured at 290° C., through an orifice having a diameter of 2.095 mm, at a cylinder outlet speed of $6.2\times10^2$ mm/min and at a take-up speed of $4.7\times10^4$ mm/min, is from 0.3 to 10 and <2> the melt index (MI, g/10 min) at 190° C. and under 2.16 kg is from 0.1 to 10, and (C) from 0 to 15% by weight of a compound miscible with or having affinity for the component (A) and the component (B), wherein the product of (a) the melt index (MI, g/10 min) of the styrene resin composition, measured at 300° C. and under 1.2 kg, and (b) the melt tension (MT, g) of the styrene resin composition, measured at 290° C. through an orifice having a diameter of 2.095 mm at a cylinder outlet speed of $6.2\times10^2$ mm/min and at a take-up speed of $4.7\times10^4$ mm/min, is at least 20.

4. A styrene resin composition as claimed in claim 3, wherein the ratio of component (C)/component (B) is from 0.1 to 0.4 (by weight) in the styrene resin composition.

5. The styrene composition according to claim 3, wherein the olefinic polymer is a polyethylene resin.

6. The styrene composition according to claim 3, wherein component (C) is a styrene-olefin copolymer.

7. The styrene composition according to claim 6, wherein the styrene-olefin copolymer comprises a styrene content of from 40 to 85% by weight.

8. The styrene resin composition according to claim 1, wherein the product of (a) the melt index (MI, g/10 min) of the styrene resin composition, measured at 300° C. and under 1.2 kg, and (b) the melt tension (MT, g) of the styrene resin composition, measured at 290° C. through an orifice having a diameter of 2.095 mm at a cylinder outlet speed of $6.2\times10^2$ mm/min and at a take-up speed of $4.7\times10^4$ mm/min, is at least 30.

9. The styrene resin composition according to claim 1, wherein the product of (a) the melt index (MI, g/10 min) of the styrene resin composition, measured at 300° C. and under 1.2 kg, and (b) the melt tension (MT, g) of the styrene resin composition, measured at 290° C. through an orifice having a diameter of 2.095 mm at a cylinder outlet speed of $6.2\times10^2$ mm/min and at a take-up speed of $4.7\times10^4$ mm/min, is from 20 to 66.

10. The styrene resin composition according to claim 3, wherein the product of (a) the melt index (MI, g/10 min) of the styrene resin composition, measured at 300° C. and under 1.2 kg, and (b) the melt tension (MT, g) of the styrene resin composition, measured at 290° C. through an orifice having a diameter of 2.095 mm at a cylinder outlet speed of $6.2\times10^2$ mm/min and at a take-up speed of $4.7\times10^4$ mm/min, is at least 30.

11. The styrene resin composition according to claim 3, wherein the product of (a) the melt index (MI, g/10 min) of the styrene resin composition, measured at 300° C. and under 1.2 kg, and (b) the melt tension (MT, g) of the styrene resin composition, measured at 290° C. through an orifice having a diameter of 2.095 mm at a cylinder outlet speed of $6.2\times10^2$ mm/min and at a take-up speed of $4.7\times10^4$ mm/min, is from 20 to 66.

* * * * *

UNITED STATES PATENT AND TRADEMARK OFFICE
CERTIFICATE OF CORRECTION

PATENT NO. : 6,451,917 B1
DATED : September 17, 2002
INVENTOR(S) : Kogure et al.

It is certified that error appears in the above-identified patent and that said Letters Patent is hereby corrected as shown below:

<u>Title page,</u>
Item [22], the PCT filing date should read:

-- [22] PCT Filed: Oct. 28, 1999 --

Signed and Sealed this

Twenty-eighth Day of January, 2003

JAMES E. ROGAN
*Director of the United States Patent and Trademark Office*